No. 634,278. Patented Oct. 3, 1899.
L. STILMANT.
SPEED CHANGING GEAR FOR CYCLES.
(Application filed June 3, 1899.)
(No Model.) 2 Sheets—Sheet 1.

No. 634,278. Patented Oct. 3, 1899.
L. STILMANT.
SPEED CHANGING GEAR FOR CYCLES.
(Application filed June 3, 1899.)
(No Model.) 2 Sheets—Sheet 2.

WITNESSES:
Wm. D. Bell
Robert J. Pollitt

INVENTOR,
Leon Stilmant,
BY.
Gartner & Steward,
Attys

UNITED STATES PATENT OFFICE.

LEON STILMANT, OF BRUSSELS, BELGIUM.

SPEED-CHANGING GEAR FOR CYCLES.

SPECIFICATION forming part of Letters Patent No. 634,278, dated October 3, 1899.

Application filed June 3, 1899. Serial No. 719,168. (No model.)

*To all whom it may concern:*

Be it known that I, LEON STILMANT, doctor, a subject of the King of Belgium, residing at Rue Jules Bouillon 8, Brussels, in the Kingdom of Belgium, have invented certain new and useful Improvements in Change-Speed Gears for Cycles and the Like, of which the following is a clear description.

This invention relates to mechanism whereby the engagement between the driving-axle of a bicycle and the sprocket wheel or wheels or other corresponding element for transferring the power from said axle to the drive-wheel of the machine may be disconnected at will. The principal advantage obtained from such a mechanism is that by duplicating it and forming the wheels or other corresponding elements for transmitting the power from the axle to the drive-wheels of the machine of different sizes variations in speed may be secured without variation in the velocity of the revolving axle—so that, for instance, when ascending hills speed may in some degree be sacrificed to power.

The invention consists in the improved mechanism for effecting a disconnective engagement between the axle and the sprocket wheel or wheels of the vehicle and in the combination and arrangement of the various parts thereof, substantially as will be hereinafter pointed out and finally embodied in the clauses of the claim.

The invention is fully illustrated in the accompanying drawings, wherein—

Figure 1:
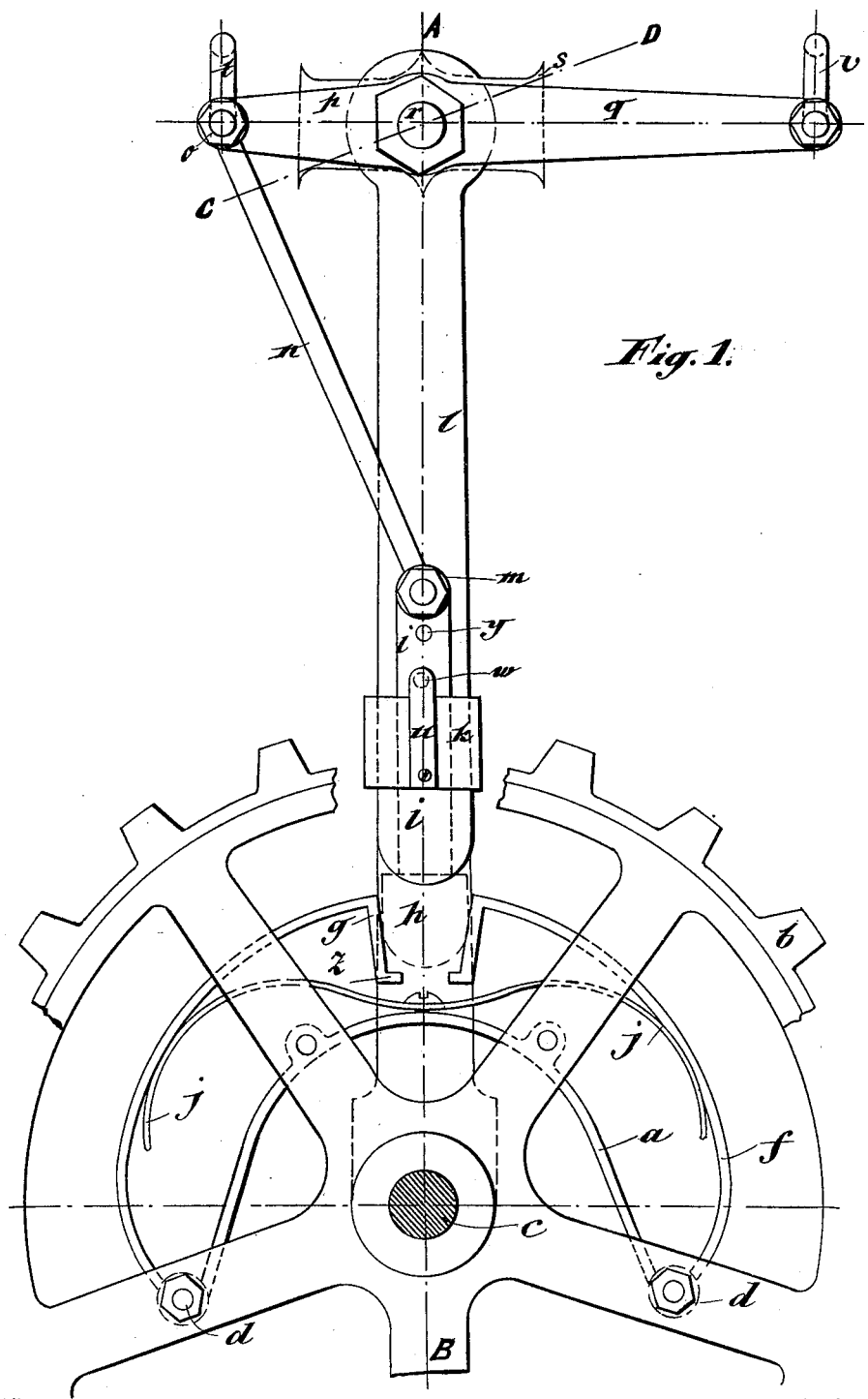
Figure 2:
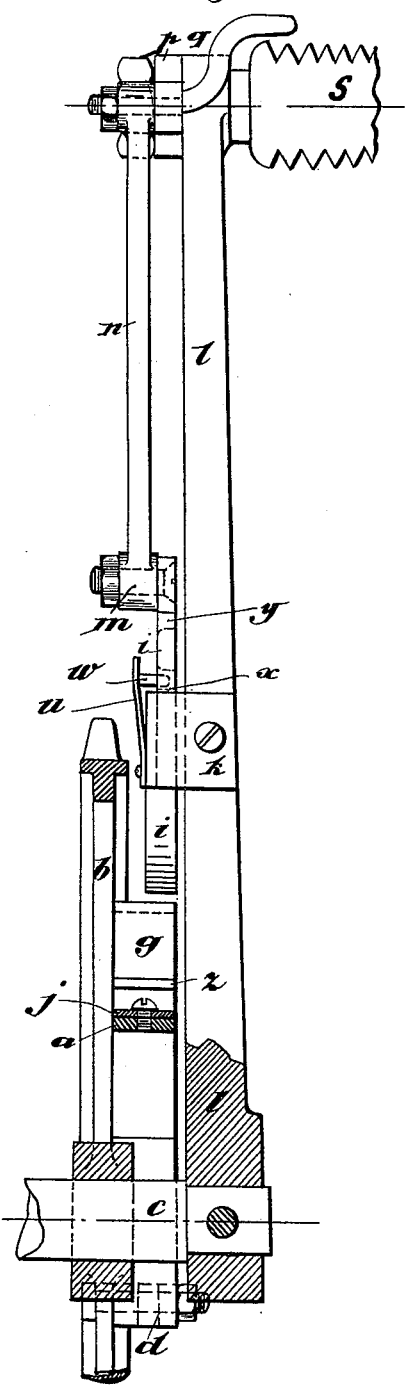

Figure 1 is a view in side elevation of my invention as applied to the crank-axle and sprocket-wheel of a bicycle; and Fig. 2 is a view in rear elevation of what is shown in Fig. 1, certain parts being shown in section.

In said drawings, $c$ designates the driving or crank axle of a bicycle, said crank-axle carrying the usual cranks $l$, which are rigidly secured thereto in any suitable manner, one at each end. Upon said axle is loosely journaled a wheel $b$. This wheel may be either in the form of a sprocket-wheel, or where the bicycle is of the chainless kind it may be in the form of a bevel-wheel and it may be duplicated, the two wheels then being of different sizes, so that one will rotate the driven element at a higher rate of speed than the other.

On the side of the sprocket-wheel $b$ which adjoins the crank is secured a curved frame $a$. The ends of the frame $a$ are held in place by bolts $d$, which penetrate spokes of the sprocket-wheel, and fulcrumed on said bolts is a pair of detents $f$, which project toward each other, extending over the frame $a$, their adjacent ends being bent downwardly and then toward each other, so as to form a socket or recess $h$.

$j$ is a curved plate-spring secured approximately at its center and beneath the socket $h$ upon the frame $a$, its extremities bearing against the detents $f$ and tending to maintain them in the position shown in the drawings. The detents $f$ it will be seen are therefore yieldingly mounted, being movable about the bolts $d$.

The crank carries a yoke $k$, which is secured thereto in any desired manner and between which and the face of the crank which is adjacent to the sprocket-wheel there is an opening in which works and is guided a bolt $i$, said bolt being therefore movable longitudinally with reference to the crank $l$. This bolt is adapted to assume either of two positions—*i. e.*, in the recess $h$, as shown in dotted lines in Fig. 1, or clear of it, as shown in full lines in said figure—and it is maintained in each of said positions by means of a plate-spring $u$, carrying a pin $w$, that engages one of two notches $y$ $x$ in the bolt. The plate-spring is secured upon the yoke $k$ and the free end of its pin $w$ and the mouth of each notch $y$ $x$ are rounded off, so that if sufficient power is applied to the bolt in moving it longitudinally the disconnection of the bolt from the plate-spring will be effected.

Upon the axle $r$ for the pedal $s$ of the crank is fulcrumed a lever $p$ $q$. Said lever is fulcrumed slightly nearer one end than the other, and on each end it carries an arm $t$ $v$, which projects laterally and in the same direction as the pedal, so that it can be easily reached by the foot of the rider. At one end said lever is connected to the bolt $i$ by means of a rod $n$, the connection being pivotal, as at $m$ $o$.

In operation when it is desired to effect an engagement between the crank (or, better, the axle) and the sprocket-wheel, which is adapted to loosely revolve on said axle, the rider simply presses upon the arm *t*, which tends to move the lever *p q* about its fulcrum and forces the bolt *i* toward the axle. If the bolt happens to be already opposite the recess or socket *h*, formed by the detents *f*, the engagement will of course be immediate, but if not that one of the detents against which it impinges will be free to give way under pressure of the spring *j* until the bolt reaches the recess or socket and snaps into place. The lower end of the bolt is rounded, as shown in Fig. 1, to facilitate its engagement with the recess or socket. To release the parts—that is to say, to unlock them—so that the axle will revolve independently of the sprocket-wheel, it is only necessary to press upon the arm *v* of the lever *p q*, so as to elevate the bolt out of the recess or socket *h*. The pressure exerted upon the arm *v* may of course be effected without the rider doing any more than merely moving his heel laterally, so as to be in the way of the arm as it is elevated toward the heel in the rotation of the crank.

Having thus fully described my invention, what I claim as new, and desire to secure by Letters Patent, is—

1. In a driving mechanism, the combination of an axle, a crank carried thereby, a wheel journaled on said axle, a bolt carried by said crank and adapted to interlock the same and the wheel, a lever fulcrumed near the end of said crank, and a rod connecting said bolt and the lever, substantially as described.

2. In a driving mechanism, the combination of an axle, a crank carried thereby, a wheel journaled on said axle, detents carried by said wheel and together forming a recess, a bolt carried by said crank, a lever fulcrumed near the end of said crank, and a rod connecting said bolt and the lever, said recess being adapted to receive the bolt and interlock the wheel and crank, substantially as described.

3. In a driving mechanism, the combination of an axle, a crank carried thereby, a wheel journaled on said axle, a bolt carried by said crank, curved detents secured upon one side of said wheel and together forming a recess, said detents being adapted to yield toward the axle, a lever fulcrumed near the end of said crank, and a rod connecting said bolt and the lever, said recess being adapted to receive the bolt to interlock the wheel and crank, substantially as described.

4. In a driving mechanism, the combination of an axle, a crank carried thereby, a wheel journaled on said axle, a bolt carried by said crank, curved spring-actuated detents secured upon one side of said wheel and together forming a recess, said detents being adapted to yield toward the axle, a lever fulcrumed near the end of said crank and a rod connecting said bolt and the lever, said recess being adapted to receive the bolt to interlock the wheel and crank, substantially as described.

5. In a driving mechanism, the combination of an axle, a crank carried thereby, a wheel journaled on said axle, detents fulcrumed on one side of said wheel and together forming a recess, a frame carried by said wheel, springs carried by said frame and bearing against the inner sides of said detents, a bolt carried by said crank, a lever also carried by said crank near the end thereof, and a connecting-rod between said bolt and said lever, said recess being adapted to receive said bolt, substantially as described.

6. In a device of the kind described, an actuating-wheel loose on the pedal-axle provided with a curved part fixed outside the spokes of the wheel, and two curved blades articulated to the ends *f* of the latter and terminating at their upper opposed ends in two extensions with stops forming a recess for the admission of a bolt or locking-pin actuated in any suitable manner and a spring intended to return and keep in their normal positions the curved movable pieces, substantially as described.

7. In a device of the kind described a bolt or locking-pin in combination with the crank and suitably guided on said crank so as to be longitudinally movable thereon, a spring-catch to hold the bolt in any required position, a connecting-rod hinged at one end to the bolt so as to actuate the latter and at the other end to a lever pivoted on the pedal-shaft, said lever being provided with two extensions arranged one in front and the other behind the pedal so as to be actuated by the foot of the rider, in order to raise or lower the bolt, substantially as described.

In testimony that I claim the foregoing I have hereto set my hand this 19th day of May, 1899.

LEON STILMANT.

Witnesses:
J. P. H. NOBLE,
GREGORY PHELAN.